United States Patent
Andre et al.

(10) Patent No.: US 7,097,236 B2
(45) Date of Patent: Aug. 29, 2006

(54) CONNECTION BETWEEN A SIDE RAIL AND A STRUCTURAL PART OF THE FRONT OF A MOTOR VEHICLE

(75) Inventors: Gerald Andre, Amberieu en Bugey (FR); Hugues Cheron, Meximieux (FR)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 10/772,146

(22) Filed: Feb. 3, 2004

(65) Prior Publication Data
US 2004/0262953 A1    Dec. 30, 2004

(30) Foreign Application Priority Data
Feb. 3, 2003    (FR)    .................................. 03 01202

(51) Int. Cl.
*B62D 24/00*    (2006.01)
(52) U.S. Cl. ................................. 296/187.04
(58) Field of Classification Search ............... 296/1.04, 296/187.04, 187.09, 187.08, 187.03, 35.1, 296/35, 132, 154, 155; 293/132, 154, 155
See application file for complete search history.

(56) References Cited

U.S. PATENT DOCUMENTS

| | | | | |
|---|---|---|---|---|
| 5,077,885 | A | * | 1/1992 | Kanemitsu et al. ............ 29/430 |
| 5,155,891 | A | * | 10/1992 | Yoshii et al. ................. 29/430 |
| 5,441,301 | A | * | 8/1995 | Breed et al. ................. 280/735 |
| 6,357,821 | B1 | * | 3/2002 | Maj et al. ............... 296/193.09 |
| 6,450,276 | B1 | * | 9/2002 | Latcau ....................... 180/68.4 |
| 6,502,653 | B1 | * | 1/2003 | Balzer et al. ............. 180/68.04 |
| 6,869,131 | B1 | * | 3/2005 | Kafuku et al. ......... 296/187.09 |
| 6,880,882 | B1 | * | 4/2005 | Andre et al. ........... 296/193.09 |
| 2004/0084236 | A1 | * | 5/2004 | Okai et al. ................. 180/68.4 |

FOREIGN PATENT DOCUMENTS

EP    1 118 530 A1    11/2000

* cited by examiner

*Primary Examiner*—H Gutman
(74) *Attorney, Agent, or Firm*—James R. Williams

(57) ABSTRACT

A connection between a side rail and a structural part at the front of a motor vehicle, the structural part having a top edge situated in the vicinity of a zone of the bodywork that might receive an impact from the head or the hip of a pedestrian, wherein the connection comprises force-opposing means enabling the side rail to oppose the vertical forces to which the part is subjected, and wherein said means are collapsible.

9 Claims, 3 Drawing Sheets

CONNECTION BETWEEN A SIDE RAIL AND A STRUCTURAL PART OF THE FRONT OF A MOTOR VEHICLE

The present invention relates to a connection between a side rail and a structural part of the front of a motor vehicle.

BACKGROUND OF THE INVENTION

The top cross-member of a cooling unit or of an equipment front face is generally installed in such a manner as to present a hard point when subjected to an impact against the head or the hip of a pedestrian.

Such rigidity makes such a top cross-member dangerous for pedestrians in the event of an impact against the head or the hip since no energy-absorbing stroke is available. On the contrary, the cross-member is dimensioned to withstand a force of up to 3000 newtons (N) over the entire width of the vehicle. Thus, the cross-member contributes directly to ensuring that the structure of the vehicle is rigid.

SUMMARY OF THE INVENTION

One of the objects of the present invention is to propose a remedy to the danger that a top cross-member presents for pedestrians, and more generally the danger presented by the rigid top edge of any structural part at the front of a motor vehicle.

The present invention provides a connection between a side rail and a structural part at the front of a motor vehicle, the structural part having a top edge situated in the vicinity of a zone of the bodywork that might receive an impact from the head or the hip of a pedestrian. The connection comprises force-opposing means enabling the side rail to oppose the vertical forces to which the part is subjected, and said means are collapsible.

The term "collapsible" is used to mean that the force-opposing means can retract, become deactivated, or be destroyed, so that in each case the result is that vertical forces are no longer opposed.

By means of the invention, an impact against a pedestrian in the vicinity of the rigid top edge of the part causes either the part to move downwards if it is not connected to any other point of the vehicle after being released vertically relative to the side rail, or else causes the part to bend and/or rupture together with its other points of connection to the vehicle.

In particular, regardless of whether the part moves down or bends, it is advantageous for it not to provide any hard point over a height of 50 millimeters (mm) below the front of the hood, so as to avoid disturbing the hood acting to absorb energy from the head or the hip of the pedestrian.

The invention presents other advantageous characteristics that can be taken in isolation or in combination:

the force-opposing means are constituted by a finger mounted on each side rail to move under drive from an actuator between an extended position in which the finger retains the part vertically, and a retracted position in which the part is released;

the actuator is a motor;

the actuator is connected to an impact sensor, preferably a sensor suitable for distinguishing between contact with a pedestrian and contact with an obstacle other than a pedestrian;

the force-opposing means are constituted by a fixed finger that is breakable above a predetermined vertical force threshold to which the part is subjected;

the force-opposing means comprise a fusible portion of the part;

the force-opposing means are constituted by an insert embedded in the part and fixed to the side rail, said insert being configured to split the part beyond a predetermined threshold of vertical force to which said part is subjected;

the part carries an electrical hood lock which is caused to open by a sensor that has detected contact with a pedestrian;

the ends of the part lie under fender linings of the vehicle and are secured thereto by fusible fasteners, e.g. overmolded or crimped inserts;

the part is a cooling unit; and the part is an equipment front face.

BRIEF DESCRIPTION OF THE DRAWINGS

To facilitate understanding the invention, there follows a description of two embodiments given with reference to the accompanying drawings, in which.

DETAILED DESCRIPTION OF THE INVENTION

Figure 1:
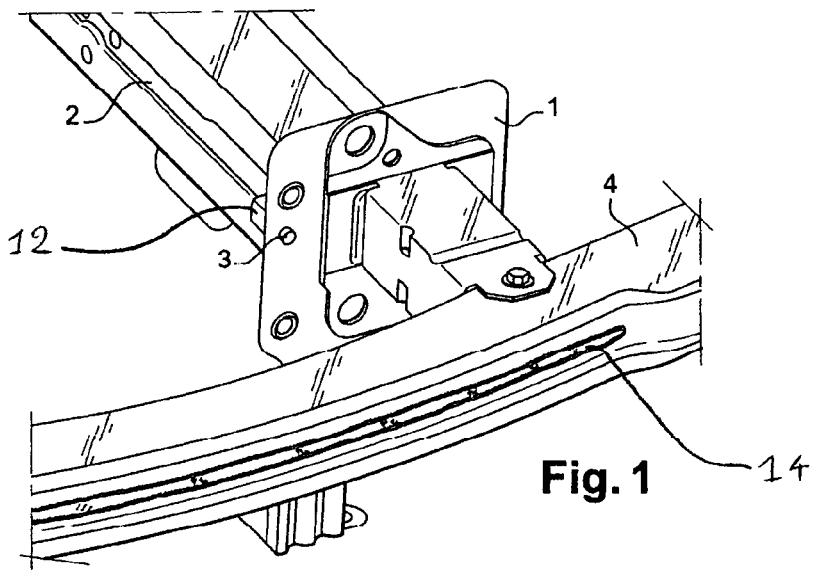
FIG. 1 shows one end of the side rail carrying an impact beam.

FIG. 1 shows a connection plate 1 at the end of a side rail 2. The connection plate 1 carries a motor-driven moving finger 3 which projects from the front face of said plate.

In conventional manner, the connection plate 1 also supports an impact beam 4.

Figure 2:
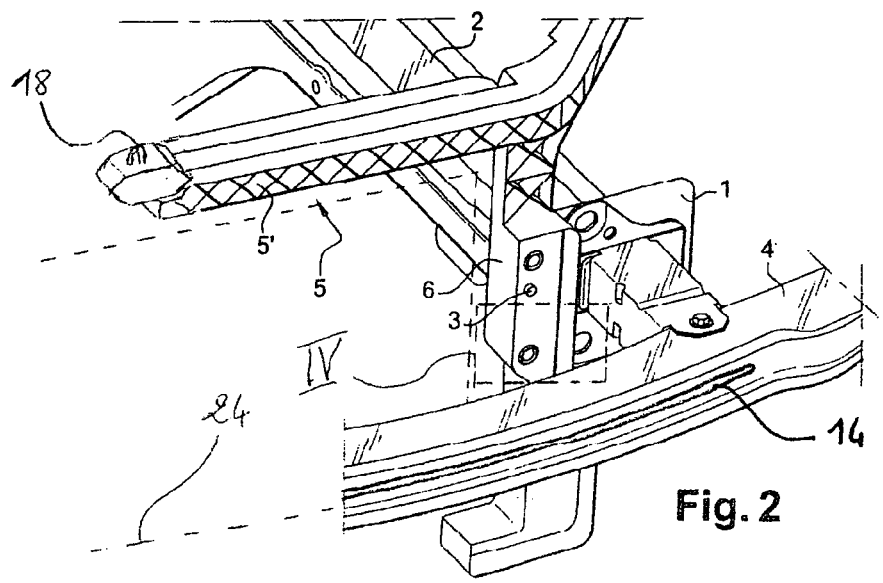
FIG. 2 is a view analogous to FIG. 1 after an equipment front face has been mounted on the side rail.

In FIG. 2, there can be seen an equipment front face 5 comprising a horizontal top cross-member 5' and two vertical uprights 6 (only one of which is visible in the figure), the uprights being designed to press against the plates.

The equipment front face 5 forms a structural part of the front of the vehicle, and is designed to oppose forces generated by the hood and by vehicle vibration.

Optionally, the structural part includes a cooling unit 24, as shown in FIG. 2.

The equipment front face 5 is connected to the vehicle via connections designed so as to be capable of opposing forces and bending torque along any axis other that the vertical axis. In the normal configuration, vertical forces are fully opposed by the moving fingers 3 on the two side rails 2.

In addition, a sensor 14 suitable for distinguishing between contact with a leg and contact with some other type of obstacle provides detection information for triggering the motor 12 of each finger 3 in the event of a pedestrian being detected. The motor 12 acts as an actuator 12 for the finger.

Optionally, the equipment front face 5 carries an electrical hood lock 18 which is caused to open by the sensor 14 that has detected contact with a pedestrian.

Figure 3:
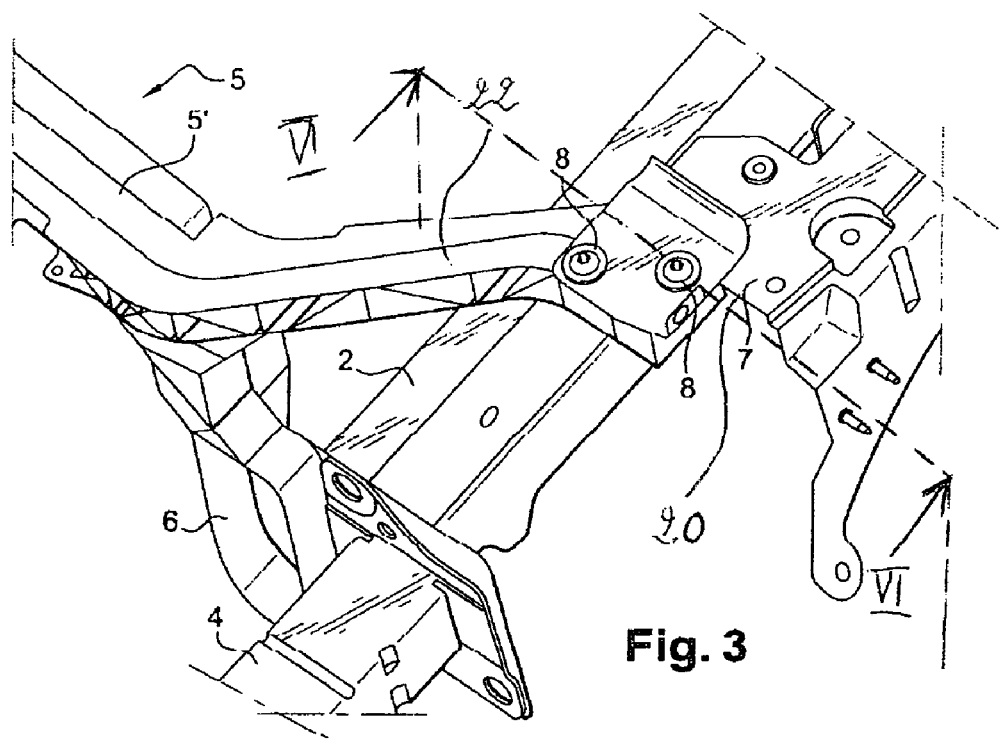
FIG. 3 shows the same parts seen from beneath.

When the motor is actuated, the finger 3 is withdrawn so as to become flush with the front face of the connection plate, thereby releasing the upright 6 of the equipment front face 5 in the vertical direction. The equipment front face 5 can thus move downwards relative to the side rail if it is not connected to any other point of the vehicle, or else it can be suspended from the fender liners 7, as shown in FIG. 3.

Figure 6:
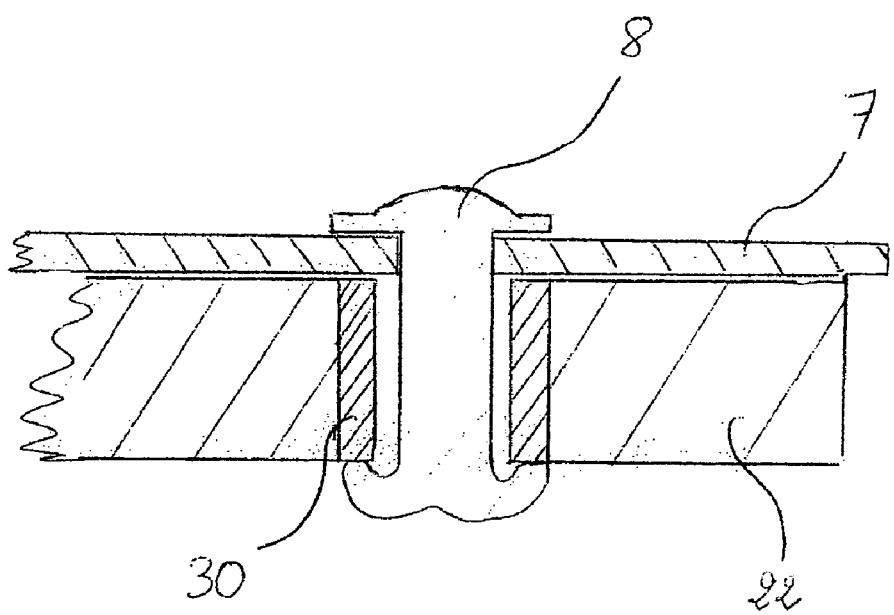
FIG. 6 is a VI—VI section view of the end of the top cross member of the equipment front face of FIG. 3.

The end 22 of the top cross-member 5' of the front face 5, secured to the fender lining 7, passes beneath the bottom 20 of the fender lining 7 and is secured thereto by fusible rivets 8, e.g. made of plastics material, and by inserts 30 as shown in FIG. 6, for example, overmolded or crimped inserts 30.

If the force imparted by the head of a pedestrian against the top cross-member 5' is large, then the rivets 8 break and the top cross-member moves downwards, thereby enabling the energy of the impact to be absorbed by the hood.

Figure 4:
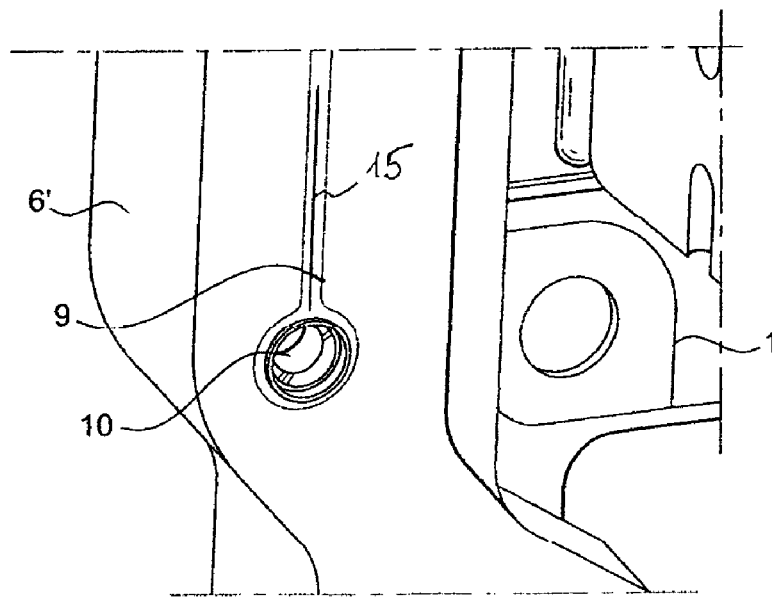
FIG. 4 is a detail view at location IV of FIG. 2, showing another embodiment.

In the example of FIG. 4, the uptight 6' of the front face 5 has slots 15 in a region 9 about a connection eyelet 10. The eyelet is designed to receive a bolt (not shown) for fastening the equipment front face to the plate 1 of the side rail. Each slot 15 forms a fusible portion of the uptight 6'.

In the event of a vertical force being imparted to the equipment front face 5 above a certain threshold, the slots, which constitute rupture starters, propagate along the upright which then moves down past the bolt.

The threshold force is determined by the configuration of the slots to lie in the range 3000 N to 4000 N, so that the front face can withstand the stresses applied to its top cross-member under normal conditions of use of the vehicle, but moves downwards in the event of an impact against a head or a hip.

Figure 5:
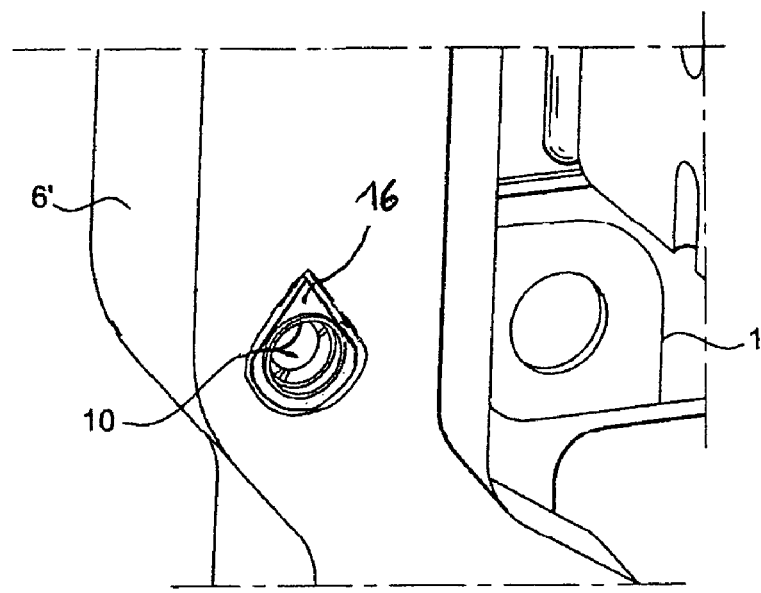
FIG. 5 is a detail view at location IV of FIG. 2, showing another embodiment.

To split the upright, it is possible to provide an insert 16 in the form of a wedge disposed around the connection eyelet 10, as shown in FIG. 5.

The examples described above are not limiting in any way.

What is claimed is:

1. A connection for use in a motor vehicle having bodywork adapted for receiving an impact, the motor vehicle comprising a side rail, fender linings comprising a bottom, and a structural part supporting the bodywork and comprising a top edge and a plurality of ends, the top edge situated near a zone of the bodywork that might be impacted by a head or hip of a pedestrian, and the ends extending beneath the bottom of the fender linings, the connection comprising a collapsible force-opposing member that enables the side rail to oppose a vertical force; and at least one fusible fastener securing each end of the structural part to the fender lining, and comprising an insert selected from the group consisting of an overmolded insert or a crimped insert.

2. A connection for use in a motor vehicle having bodywork adapted for receiving an impact, the motor vehicle comprising a plurality of side rails and a structural part supporting the bodywork, the structural part comprising a top edge situated near a zone of the bodywork that might be impacted by a head or hip of a pedestrian, the connection comprising a collapsible force-opposing member that enables the side rail to oppose a vertical force and that comprises a finger mounted on each side rail, an actuator capable of moving the finger between an extended position in which the finger retains the structural part vertically, and a retracted position in which the structural part is released; and an actuator capable of moving the finger between an extended position in the which the finger retains the structural part vertically and a retracted position in which the structural part is released.

3. A connection according to claim 2, wherein the actuator is a motor.

4. A connection according to claim 2, wherein the actuator is connected to an impact sensor capable of identifying contact between the bodywork and a pedestrian.

5. A connection according to claim 2, wherein the motor vehicle comprises a front face and the front face comprises the structural part, and the structural part includes a cooling unit.

6. A connection for use in a motor vehicle having bodywork adapted for receiving an impact, the connection comprising a side rail and a structural part supporting the bodywork, the structural part comprising a top edge situated near a zone of the bodywork that might be impacted by a head or hip of a pedestrian, the connection comprising a collapsible force-opposing member that enables the side rail to oppose a vertical force, the force-opposing member comprising an insert embedded in the structural part and fixed to the side rail, the insert adapted to split the structural part when subjected to vertical force above a predetermined threshold.

7. A connection according to claim 6, wherein the motor vehicle comprises a front face and the front face comprises the structural part, and the structural part includes a cooling unit.

8. A connection for use in a motor vehicle having bodywork adapted for receiving an impact, the connection comprising a side rail and a structural part supporting the bodywork, the structural part comprising a hood lock and a top edge situated near a zone of the bodywork that might be impacted by a head or hip of a pedestrian, the connection comprising a collapsible force-opposing member that enables the side rail to oppose a vertical force, and a sensor capable of releasing the hood lock when the bodywork impacts a pedestrian.

9. A connection according to claim 8, wherein the motor vehicle comprises a front face and the front face comprises the structural part, and the structural part includes a cooling unit.

\* \* \* \* \*